United States Patent
Castellani et al.

(10) Patent No.: US 6,255,399 B1
(45) Date of Patent: Jul. 3, 2001

(54) CABLES WITH A HALOGEN-FREE RECYCLABLE COATING COMPRISING POLYPROPYLENE AND AN ETHYLENE COPOLYMER HAVING HIGH STRUCTURAL UNIFORMITY

(75) Inventors: Luca Castellani, Corsico; Eduardo Redondo Grizante, Monza; Antonio Zaopo, Milan; Enrico Albizzati, Arona, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/121,558

(22) Filed: Jul. 23, 1998

(30) Foreign Application Priority Data

Jul. 23, 1997 (IT) ............................................. MI97A1739

(51) Int. Cl.[7] .................................................... F16H 21/44
(52) U.S. Cl. .................................... 525/232; 174/102 SC; 174/110 R; 174/120 R; 174/121 A; 174/120 SC; 428/378; 428/379; 525/240
(58) Field of Search ........................ 174/120 R, 110 R, 174/121 A, 102 SC, 120 SC; 428/378, 379; 525/232, 240

(56) References Cited

U.S. PATENT DOCUMENTS

| | | |
|---|---|---|
| Re. 31,518 | 2/1984 | Fischer . |
| 4,098,762 | 7/1978 | Miyata et al. . |
| 4,130,535 | 12/1978 | Coran et al. . |
| 4,145,404 | 3/1979 | Miyata et al. . |
| 4,317,765 | 3/1982 | Gaylord . |
| 4,348,459 | 9/1982 | Drzal et al. . |
| 4,948,669 | 8/1990 | Rolland . |
| 4,948,840 | 8/1990 | Berta . |
| 4,985,502 | 1/1991 | Izumi et al. . |
| 5,008,204 | 4/1991 | Stehling .................... 436/85 |
| 5,229,478 | 7/1993 | Floyd et al. .................... 526/160 |
| 5,246,783 | 9/1993 | Spenadel et al. .................... 428/461 |
| 5,272,236 | 12/1993 | Lai et al. .................... 526/348.5 |
| 5,414,040 | 5/1995 | McKay et al. . |
| 5,525,757 | 6/1996 | O'Brien . |

FOREIGN PATENT DOCUMENTS

| | | |
|---|---|---|
| 0 328 051 A1 | 8/1989 | (EP) . |
| 0 530 940 A1 | 3/1993 | (EP) . |
| 0 542 253 B1 | 5/1993 | (EP) . |
| 0 618 259 A2 | 10/1994 | (EP) . |
| 0 632 065 A1 | 1/1995 | (EP) . |
| 0 780 425 A1 | 6/1997 | (EP) . |
| 0 416 815 B1 | 8/1997 | (EP) . |
| 0 418 044 B1 | 9/1997 | (EP) . |
| 63-225641 | 9/1988 | (JP) . |
| 1-294792 | 11/1989 | (JP) . |
| 3-231944 | 10/1991 | (JP) . |
| 5-17692 | 1/1993 | (JP) . |
| 7-161230 | 6/1995 | (JP) . |
| WO 93/19107 | 9/1993 | (WO) . |
| WO 94/06859 | 3/1994 | (WO) . |
| WO 96/23311 | 8/1996 | (WO) . |
| WO 96/27885 | 9/1996 | (WO) . |

OTHER PUBLICATIONS

L. Wild et al., "Determination of Branching Distributions in Polyethylene and Ethylene Copolymers," Journal of Polymer Science: Polymer Physics Edition, vol. 20, pp. 441–455 (1982).

P.C. Möhring & N.J. Coville, "Homogeneous Group 4 metallocene Ziegler–Natta catalysts: the influence of cyclopentadienyl–ring substituents," Journal of Organometallic Chemistry, vol. 479, pp. 1–29 (1994).

V.K. Gupta et al., "Metallocene Complexes of Group 4 Elements in the Polymerization of Monoolefins," Journal of Macromolecular Science: Reviews in Macromolecular Chemistry and Physics, vol. C34, No. 3, pp. 439–514 (1994).

AN 98–205243, "Low–Smoke, Self–Extinguishing Electric Cable Coating Composition—Comprises a Crystalline Propylene Polymer, a Copolymer of Ethylene With an Alpha––Olefin and Optionally a Diene, and Natural Magnesium Hydroxide," Derwent Publications, Ltd., London, GB, XP–002084928 (1998).

*Primary Examiner*—Bernard Lipman
(74) *Attorney, Agent, or Firm*—Finnegan, Henderson, Farabow, Garrett & Dunner, L.L.P.

(57) ABSTRACT

A cable, in particular for power transmission, for telecommunications or for data transmission, or also combined power/telecommunications cables, wherein at least one coating layer consists of a recyclable material which is halogen-free and has superior mechanical and electrical properties. This material consists of a polymer mixture comprising: (a) a crystalline propylene homopolymer or copolymer; and (b) a copolymer of ethylene with at least one alpha-olefin having from 4 to 12 carbon atoms, and optionally with a diene; the said copolymer (b) being characterized by a density of between 0.90 and 0.86 g/cm$^3$ and by a Composition Distribution Index, defined as the weight percentage of copolymer molecules having an alpha-olefin content within 50% of the average total molar content of alpha-olefin, of greater than 45%.

20 Claims, 1 Drawing Sheet

CABLES WITH A HALOGEN-FREE RECYCLABLE COATING COMPRISING POLYPROPYLENE AND AN ETHYLENE COPOLYMER HAVING HIGH STRUCTURAL UNIFORMITY

CROSS-REFERENCES TO RELATED APPLICATIONS

Applicant claims the right of priority under 35 U.S.C. § 119(a)–(d) based on patent application No. MI97A 001739, filed Jul. 23, 1997, in Italy.

BACKGROUND OF THE INVENTION

1. Field of the Invention

The present invention relates to cables, in particular for power transmission, for telecommunications or for data transmission, or also combined power/telecommunications cables, wherein at least one coating layer consists of a recyclable material which is halogen-free and has superior mechanical and electrical properties.

2. Description of the Related Art

There is currently a great need for highly environmentally friendly products, consisting of materials which are not harmful to the environment either during their production or when in use, and which are readily recyclable at the end of their working life. However, the option of using ecological materials is, in all cases, subject to the need to keep costs within acceptable limits, while still guaranteeing performances which are at least equivalent to those of conventional materials and which are, in any case, satisfactory under the most common conditions of use.

In the cables sector, in particular power transmission cables, the various coatings surrounding the conductor commonly consist of crosslinked polymer materials, in particular polyethylene or ethylene copolymers suitably crosslinked during extrusion, so as to give satisfactory mechanical performances even under heating in continuous use and under conditions of current overload, while at the same time maintaining a high level of flexibility. These materials are crosslinked and therefore cannot be recycled since they are devoid of thermoplastic properties, hence they can only be disposed of at the end of their working life by means of incineration. Moreover, in certain cases the outer protective sheath consists of polyvinyl chloride (PVC) which is difficult to separate by conventional methods (for example in water by density differences) from the crosslinked polyolefins containing inorganic fillers (for example from ethylene/propylene rubbers containing inorganic fillers), and, on the other hand, PVC cannot be incinerated together with crosslinked polyolefins since this produces highly toxic chlorinated products by combustion.

In U.S. Pat. No. 4,948,669 cable-coating compositions are described comprising from 29 to 50% by weight of low-density polyethylene, containing as comonomer an alpha-olefin having from 4 to 12 carbon atoms, in particular 1-octene, in an amount such as to obtain a density of between 0.90 and 0.92 g/cm$^3$, in admixture with: (a) a propylene homopolymer; (b) a non-elastomeric copolymer of propylene with ethylene; or (c) heterogeneous copolymers of propylene with ethylene, obtained in reactor. As polyethylene it is particularly suggested using product Dowlex® 4000E from Dow Chemical, containing about 17% of 1-octene and having a melt index equal to 3.3 and a density of 0.912 g/cm$^3$. These are products obtained using titanium-based Ziegler-Natta catalysts, having a relatively high density and thus little flexibility.

In patent application WO 96/23311 a low-voltage high-current cable is described, wherein the insulating coating, the inner sheath and the outer sheath are made of the same non-crosslinked polymer-based material which is black coloured by addition of carbon black. Using the same base material would allow recycling without the need to separate different materials. As polymer material for the outer sheath, it is suggested using, in place of PVC, ultra-low-density polyethylene (ULD-PE), for example products Engage® from DuPont-Dow Elastomers and Exxpol® from Exxon. Inorganic fillers such as aluminium or magnesium hydroxide are added to these materials in order to give them flame-retardant properties.

In U.S. Pat. No 5,246,783 cables are described, having as insulating and/or semiconductive coatings polymer materials based on copolymers of ethylene with at least one $C_3$–$C_{20}$ alpha-olefin, with a density of from 0.86 to 0.96 g/cm$^3$, known commercially under the tradename Exact® from Exxon, preparable using metallocene catalysts. These copolymers are used in crosslinked form, achieved by chemical means (for example with dicumyl peroxide) or by irradiation.

BRIEF DESCRIPTION SUMMARY OF THE INVENTION

The Applicant has perceived that the technical problem of obtaining a cable with a coating made of a non-crosslinked, and thus recyclable, polymer material which also has mechanical and electrical properties suitable to the usual conditions of use is dependent on the use of a crystalline propylene homopolymer or copolymer mixed with a copolymer of ethylene with an alpha-olefin having a low density and a high structural uniformity, in particular having a highly homogeneous distribution of the alpha-olefin between the polymer molecules. This high structural uniformity is obtainable in particular by copolymerization of the corresponding monomers in the presence of a single-site catalyst, for example a metallocene catalyst.

In particular, the Applicant has found that excellent performances, both in terms of mechanical properties, in particular elongation at break, stress at break and modulus, and in terms of electrical properties, may be obtained by using, as non-crosslinked base material for at least one of the coating layers of the cable, a mixture as defined hereinbelow, comprising polypropylene and a copolymer of ethylene with at least one $C_4$–$C_{12}$ alpha-olefin and optionally with a diene comonomer, having a density of from 0.90 to 0.86 g/cm$^3$ and a Composition Distribution Index, defined as the weight percentage of copolymer molecules having an alpha-olefin content within 50% of the average total molar content of alpha-olefin, of greater than 45%.

Therefore, according to a first aspect, the invention relates to a cable comprising a conductor and one or more coating layers, wherein at least one of the said coating layers comprises, as non-crosslinked base polymer material, a mixture comprising: (a) a crystalline propylene homopolymer or copolymer; and (b) a copolymer of ethylene with at least one alpha-olefin having from 4 to 12 carbon atoms, and optionally with a diene; the said copolymer (b) being characterized by a density of from 0.90 to 0.86 g/cm$^3$ and a Composition Distribution Index, defined as the weight percentage of copolymer molecules having an alpha-olefin content within 50% of the average total molar content of alpha-olefin, of greater than 45%.

According to a further aspect, the invention relates to a cable comprising a conductor and one or more coating layers, wherein at least one of the said coating layers has electrical insulating properties and comprises a mixture as defined above as non-crosslinked base polymer material.

According to a further aspect, the invention relates to a cable comprising a conductor and one or more coating layers, wherein at least one of the said coating layers has semiconductive properties and comprises a mixture as defined above as non-crosslinked base polymer material.

According to a further aspect, the invention relates to a cable comprising a conductor and one or more coating layers, wherein at least one of the said coating layers is an outer protective sheath and comprises a mixture as defined above as non-crosslinked base polymer material.

According to a further aspect, the invention relates to a cable comprising a conductor and one or more coating layers, wherein at least 70%, preferably at least 90%, by weight relative to the total weight of the base polymer material of the said coating layers consists of the mixture as defined above.

The Composition Distribution Index provides a measure of the distribution of the alpha-olefin between the copolymer molecules (the higher the value of this index, the more homogeneous is the distribution of the comonomer between the copolymer molecules) and can be determined by techniques of Temperature Rising Elution Fractionation, as described, for example, in patent U.S. Pat. No. 5,008,204 or in Wild et al., *J. Poly. Sci. Poly. Phys. Ed.*, Vol. 20, p.441 (1982).

The copolymers (b) have a molecular weight distribution index, defined as the ratio between the weight-average molecular weight $M_w$, and the number-average molecular weight $M_n$, which is generally low, usually between 1.5 and 3.5. The molecular weight distribution index can be determined by conventional methods, by means of Gel Permeation Chromatography (GPC).

The copolymers (b) are also generally characterized by a melting enthalpy of from 30 to 60 J/g.

Copolymers of ethylene with at least one $C_4$–$C_{12}$ alpha-olefin, and optionally with a diene, having these characteristics are obtainable by copolymerization of ethylene with the alpha-olefin, and optionally with the diene comonomer, in the presence of a single-site catalyst, for example a metallocene catalyst, as described, for example, in U.S. Pat. Nos. 5,246,783 and 5,272,236, or alternatively they may be obtained commercially under the trademarks Engage® from DuPont-Dow Elastomers and Exact® from Exxon Chemical. The metallocenes used to polymerize the olefins are coordination complexes of a transition metal, usually from Group IV, in particular titanium, zirconium or hafnium, with two optionally substituted cyclopentadienyl ligands, used in combination with a co-catalyst, for example an alumoxane, preferably methylalumoxane, or a boron compound (see for example J. M. S.-Rev. Macromol. Chem. Phys., C34(3), 439–514 (1994); J. Organometallic Chemistry, 479 (1994), 1–29, or alternatively patents U.S. Pat. Nos. 5,414,040, 5,229,478, WO 93/19107 and EP-A-632,065, or the already mentioned U.S. Pat. Nos. 5,246,783 and 5,272,236). Catalysts which are suitable for obtaining the copolymers (b) according to the present invention are also the so-called Constrained Geometry Catalysts described, for example, in patents EP-416,815 and EP-418,044.

With the term alpha-olefin it is meant an olefin of formula $CH_2=CH-R$, where R is a linear or branched alkyl having from 2 to 10 carbon atoms. The alpha-olefin may be selected, for example, from 1-butene, 1-pentene, 4-methyl-1-pentene, 1-hexene, 1-octene, 1-dodecene and the like. 1-hexene and 1-octene are particularly preferred.

When a diene termonomer is present, this generally has from 4 to 20 carbon atoms, and is preferably selected from: linear, conjugated or non-conjugated diolefins, for example 1,3-butadiene, 1,4-hexadiene or 1,6-octadiene; monocyclic or polycyclic dienes, for example 1,4-cyclohexadiene, 5-ethylidene-2-norbornene, 5-methylene-2-norbornene and the like.

Ethylene/alpha-olefin or ethylene/alpha-olefin/diene copolymers which can be used according to the present invention generally have the following composition: 75–97 mol %, preferably 90–95 mol %, of ethylene; 3–25 mol %, preferably 5–10 mol %, of alpha-olefin; 0–5 mol %, preferably 0–2 mol %, of a diene.

The crystalline propylene homopolymer or copolymer (a) generally has a melting enthalpy of greater than 75 J/g, preferably greater than 85 J/g. It may be selected in particular from:

(1) isotactic propylene homopolymers with an isotactic index of greater than 80, preferably greater than 90, even more preferably greater than 95;

(2) propylene homopolymers obtainable using metallocene catalysts, having a pentad mmmm content of greater than 90% (determined by $^{13}$C-NMR analysis);

(3) crystalline copolymers of propylene with ethylene and/or an alpha-olefin having from 4 to 10 carbon atoms, with an overall content of ethylene and/or alpha-olefin of less than 10 mol %;

(4) heterogeneous propylene copolymers obtainable by block polymerization of propylene and of mixtures of propylene with ethylene and/or an alpha-olefin having from 4 to 10 carbon atoms, containing at least 70% by weight of polypropylene homopolymer or of crystalline propylene/ethylene copolymer, with an isotactic index of greater than 80, the remainder consisting of an elastomeric ethylene/propylene copolymer with a propylene content of from 30 to 70% by weight;

(5) crystalline propylene homopolymers or copolymers of syndiotactic structure, obtainable using metallocene catalysts.

According to the present invention, the ethylene/alpha-olefin or ethylene/alpha-olefin/diene copolymer (b) as described above is present in admixture with the crystalline propylene homopolymer or copolymer (a) in a predetermined amount, such as to make the resulting polymer mixture sufficiently flexible, and in particular so as to give it a elongation at break value, measured according to CEI standard 20-34, §5.1, of at least 100%, preferably of at least 200%, and a 20% modulus value, measured according to CEI standard 20-34, §5.1, of less than 10 MPa, preferably less than 7 MPa.

In general, these characteristics are obtainable using mixtures comprising from 10 to 60%, preferably from 15 to 50%, by weight of crystalline propylene homopolymer or copolymer (a) and from 40 to 90%, preferably from 50 to 85%, by weight of ethylene/alpha-olefin or ethylene/alpha-olefin/diene copolymer (b), the percentages being relative to the total weight of the polymeric components (a) and (b).

In accordance with the present invention, the use of non-crosslinked polymer mixtures as defined above makes it possible to obtain a recyclable, flexible coating which has excellent mechanical properties, both in terms of modulus and in terms of elongation and stress at break. In particular, it is possible to obtain mechanical performances under heating, that is at 90° C. for continuous use and at 130° C. in the case of current overload, which are comparable with the typical performances of the polyethylene-based crosslinked coatings currently on sale, making the above-mentioned mixtures suitable not only for low voltage but also for medium- and high-voltage cables.

The mechanical properties mentioned above are accompanied by excellent electrical properties, such as insulation constant (Ki) and dielectric loss (tan delta), both under dry conditions and when the cable is submerged in water. In particular, it has been found that the non-crosslinked material according to the present invention has a very high insulation constant which is maintained within acceptable values even after prolonged immersion in water.

The fact that an insulating material has low water absorption makes it possible to reduce dielectric loss remarkably and thus to achieve lower energy dissipation levels, in particular during high power transmission. In the case of low-voltage high-current power transmission, low water absorption avoids an excessive reduction of electrical resistivity of the insulating material and thus of its electrical performance.

The polymer mixtures according to the present invention are also capable of containing inorganic fillers without an unacceptable reduction in their mechanical and elastic properties, in particular as to elongation at break, which remains well above 100%. It is thus possible to produce compositions with flame-retardant properties which are endowed with high flexibility and high mechanical strength.

Thus, according to a further aspect, the present invention relates to a flame-retardant polymer composition, comprising:

(a) a crystalline propylene homopolymer or copolymer;

(b) a copolymer of ethylene with at least one alpha-olefin having from 4 to 12 carbon atoms, and optionally with a diene; the said copolymer (b) being characterized by a density of between 0.90 and 0.86 $g/cm^3$ and by a Composition Distribution Index, defined as the weight percentage of copolymer molecules having an alpha-olefin content within 50% of the average total molar content of alpha-olefin, of greater than 45%;

(c) an inorganic filler in an amount such as to impart flame-retardant properties.

Moreover, a further aspect of the present invention resides in a cable comprising a conductor and one or more coating layers, wherein at least one of the said coating layers comprises a flame-retardant polymer composition as defined above.

The inorganic filler is generally an inorganic oxide, preferably in hydrate or hydroxide form. Examples of suitable compounds are aluminium, bismuth, cobalt, iron, magnesium, titanium or zinc oxides and the corresponding hydroxides, or mixtures thereof. Magnesium hydroxide, aluminium hydroxide and alumina trihydrate ($Al_2O_3.3H_2O$) or mixtures thereof are particularly preferred. One or more inorganic oxides or salts such as $CoO$, $TiO_2$, $Sb_2O_3$, $ZnO$, $Fe_2O_3$, $CaCO_3$ or mixtures thereof may advantageously be added to these compounds in minor amounts, generally less than 25% by weight. Preferably, the above-mentioned metal hydroxides, in particular magnesium and aluminium hydroxides, are used in the form of particles having sizes which can range from 0.1 to 100 $\mu$m, preferably from 0.5 to 10 $\mu$m. In the case of hydroxides, these may advantageously be used in the form of coated particles. Saturated or unsaturated fatty acids containing from 8 to 24 carbon atoms, and metal salts thereof, are usually used as coating materials, such as, for example: oleic acid, palmitic acid, stearic acid, isostearic acid, lauric acid; magnesium or zinc stearate or oleate; and the like.

The amount of inorganic filler which is suitable for imparting flame-retardant properties may vary within a wide range, generally between 10 and 80% by weight, preferably between 30 and 70% by weight, with respect to the total weight of the composition.

A coupling agent selected from those known in the art, for example silane compounds or carboxylic derivatives having at least one ethylenic unsaturation can be added to the mixture in order to enhance the compatibility between the inorganic filler and the polymer matrix.

Examples of silane compounds which are suitable for this purpose are: γ-methacryloxypropyltrimethoxysilane, methyltriethoxysilane, methyltris(2-methoxy ethoxy)silane, dimethyldiethoxysilane, vinyltris (2-methoxyethoxy)silane, vinyltrimethoxysilane, vinyl triethoxysilane, octyltriethoxysilane, isobutyl triethoxysilane, isobutyltrimethoxysilane and mixtures thereof.

Carboxylic derivatives with ethylenic unsaturation which may advantageously be used as coupling agents are, for example, unsaturated carboxylic anhydrides or, preferably, unsaturated dicarboxylic anhydrides; maleic anhydride is particularly preferred. Alternatively, it is possible to use polyolefins as compatibilizing agents, these polyolefins optionally containing ethylenic unsaturations, on which carboxylic groups have been grafted by reaction with the above-mentioned carboxylic derivatives having at least one ethylenic unsaturation.

The coupling agent, either of silane type or of carboxylic type, can be used in its normal state or can be grafted to at least one of the polymer components of the mixture.

The amount of coupling agent to be added to the mixture may vary mainly depending on the type of coupling agent used and on the amount of inorganic filler added, and is generally between 0.05 and 30%, preferably between 0.1 and 20%, by weight, relative to the total weight of the base polymer mixture.

Other conventional components such as antioxidants, fillers, processing co-adjuvants, lubricants, pigments, water-tree retardant additives and the like are usually added to the base polymer material. In the case of the semiconductive layers 3 and 5, the polymer material is preferably filled with carbon black in an amount such as to give this material semiconductive properties (namely, so as to obtain a resistivity of less than 5 ohm.m at room temperature).

Suitable conventional antioxidants are, for example: polymerized trimethyldihydroquinoline, 4,4'-thiobis(3-methyl-6-tert-butyl)phenol; pentaerythryl-tetra[3-(3,5-di-tert-butyl-4-hydroxyphenyl)propionate], 2,2'-thiodiethylene-bis[3-(3,5-di-tert-butyl-4-hydroxyphenyl)propionate] and the like, or mixtures thereof.

Other fillers which may be used in the present invention include, for example, glass particles, glass fibres, calcined kaolin, talc and the like, or mixtures thereof. Processing co-adjuvants usually added to the polymer base are, for example, calcium stearate, zinc stearate, stearic acid, paraffin wax and the like, or mixtures thereof.

BRIEF DESCRIPTION OF THE DRAWINGS

Further details will be illustrated in the following detailed description, with reference to the appended drawing, wherein.

DETAILED DESCRIPTION OF THE INVENTION

Figure 1:
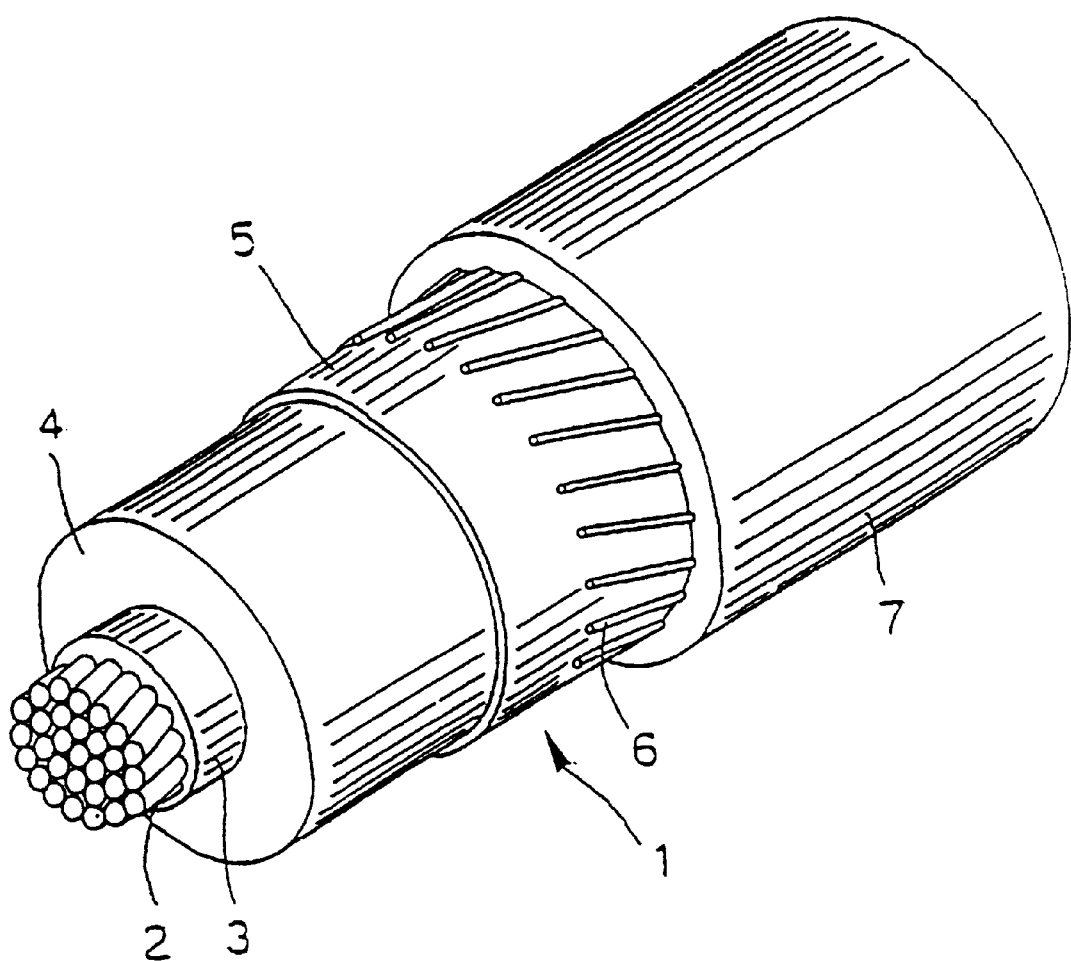
FIG. 1 is a perspective view of an electrical cable, particularly suitable for medium voltages, according to the present invention.

In FIG. 1, the electrical cable 1 comprises a conductor 2; an inner layer 3 with semiconductive properties; an intermediate layer 4 with insulating 5 properties; an outer layer 5 with semiconductive properties; a screen 6; and an outer sheath 7.

The conductor 2 generally consists of metal wires, preferably made of copper or aluminium, which are braided together using conventional techinques.

At least one of the layers 3, 4 and 5, and preferably at least the insulating layer 4, comprises polypropylene as non-crosslinked base polymer material, mixed with a copolymer of ethylene with at least one alpha-olefin, and optionally with a diene, as defined above. In a preferred embodiment of the present invention, all of the insulating and semiconductive layers 3, 4 and 5 comprise a polymer mixture as defined above as non-crosslinked base polymer material.

A screen 6, generally consisting of helically wound electrically conductive wires or strips, is usually placed around the outer semiconductive layer 5. This screen is then covered with a sheath 7, consisting of a thermoplastic material such as polyvinyl chloride (PVC), non-crosslinked polyethylene (PE) or, preferably, a mixture comprising polypropylene and an ethylene/alpha-olefin or ethylene/alpha-olefin/diene copolymer, as defined above.

FIG. 1 shows only one possible embodiment of a cable according to the present invention. It is clear that suitable changes known in the art may be made to this embodiment without thereby departing from the scope of the present invention. In particular, the recyclable polymer mixtures according to the present invention may advantageously also be used for coating telecommunications cables or data transmission cables, or alternatively combined power/telecommunications cables.

The properties of the polymer materials used according to the present invention (Cop. 1 and 2) and of the material used for comparative purposes (Cop. 3) are given in Table 1. As melting enthalpy the second melting value ($\Delta H_{2m}$) is given, obtained by DSC at a scan speed of 10° C./min. The melt flow index (MFI) was measured according to ASTM standard D 1238/L (at 230° C. and 21.6 N for polypropylene, and at 190° C. and 21.6 N for ethylene/1-octene copolymers). The Composition Distribution Index (CDI) was determined by Temperature Rising Elution Fractionation techniques.

TABLE 1

| Polymer material | Density (g/cm³) | MFI (dg/min) | CDI (%) | $\Delta H_{2m}$ (J/g) |
|---|---|---|---|---|
| PP 1 | 0.900 | 1.6 | — | 98 |
| PP 2 | 0.900 | 1.8 | — | 90 |
| Cop. 1 | 0.885 | 1.0 | >70 | 55.6 |
| Cop. 2 | 0.868 | 0.5 | >70 | 34.4 |
| Cop. 3 | 0.902 | 3.0 | — | 78.0 |

PP 1 (Moplen® S30G—Montell): isotactic poly propylene (homopolymer);

PP 2 (Moplen® EP2S30B—Montell): random crystalline propylene/ethylene copolymer;

Cop. 1 (Engage® 8003—DuPont-Dow Elastomers): ethylene/1-octene copolymer with 82/18 weight ratio (5.5 mol % of 1-octene), obtained by metallocene catalysis;

Cop. 2 (Engage® 8150—DuPont-Dow Elastomers): ethylene/1-octene copolymer with 75/25 weight ratio (7.6 mol % of 1-octene), obtained by metallocene catalysis;

Cop. 3 (Stamylex® TMX 1000—DSM): ethylene/1-octene copolymer (4.6 mol % of 1-octene), obtained using a titanium Ziegler-Natta catalyst.

The polymer materials in Table 1 were used to prepare the mixtures given in Table 2.

The mixtures 1–3a were prepared in a Brabender mixer (volume of the mixing chamber: 80 cm³), filled to 95% of volume. Mixing was carried out at a temperature of 170° C. for a total time of 10 min (rotor speed: 40 rpm). At the end of the mixing, the final torque (reported in Table 2) was measured under the abovementioned conditions.

Mixtures 4, 5 and 6 were prepared in a 20 mm-diameter counter-rotatory Brabender twin-screw mixer with a rotor speed of 50 rpm and with the following temperature profile: 1st zone=100° C., 2nd zone=160° C., 3rd zone=190° C., 4th zone=190° C.

For the filled systems there were used:

Hydrofy® GS-1.5: $Mg(OH)_2$ coated with stearic acid from SIMA (average particle diameter: 2 μm; specific surface: 11 m²/g);

Rhodorsil® MF175U: silicone rubber from Rhône-Poulenc acting as processing co-adjuvant/lubricant.

The following were used as antioxidants:

Irganox® 1010: pentaerythritol tetra[3-(3,5-di-tert-butyl-4-hydroxyphenyl)propionate] (Ciba-Geigy);

Irganox® PS802 FL: distearyl thiodipropionate (DSTDP) (Ciba-Geigy).

The compositions are given in Table 2 as phr (i.e. parts by weight per 100 parts of polymer matrix).

The mixtures thus obtained were subjected to mechanical tensile strength tests according to CEI standard 20-34, §5.1, on test specimens obtained from 1 mm-thick plates obtained by compression moulding at 190–195° C. and 200 bar after preheating for 5 min at the same temperature. The pulling speed of the clamps was 250 mm/min for mixtures 1 –3a, and 50 mm/min for mixtures 4, 5 and 6. The results are given in Table 2.

TABLE 2

| EXAMPLE | 1 | 1a | 2 | 2a | 3(*) | 3a(*) | 4 | 5 | 6(*) |
|---|---|---|---|---|---|---|---|---|---|
| PP 1 | — | — | — | — | — | — | 40 | 40 | 40 |
| PP 2 | 35 | 35 | 35 | 35 | 35 | 35 | — | — | — |
| Cop. 1 | 65 | 65 | — | — | — | — | 60 | — | — |
| Cop. 2 | — | — | 65 | 65 | — | — | — | 60 | — |
| Cop. 3 | — | — | — | — | 65 | 65 | — | — | 60 |
| Hydrofy ® GS-1.5 | — | 160 | — | 160 | — | 160 | — | — | — |
| Rhodorsil ® MF175U | — | 1.5 | — | 1.5 | — | 1.5 | — | — | — |
| Irganox ® PS 802FL | — | — | — | — | — | — | 0.2 | 0.2 | 0.2 |
| Irganox ® 1010 | — | 0.5 | — | 0.5 | — | 0.5 | 0.1 | 0.1 | 0.1 |
| Final torque (N · m) | 6.2 | 9.8 | 7.8 | 11.2 | 6.1 | 7.3 | — | — | — |

TABLE 2-continued

| EXAMPLE | 1 | 1a | 2 | 2a | 3(*) | 3a(*) | 4 | 5 | 6(*) |
|---|---|---|---|---|---|---|---|---|---|
| Stress at break (MPa) | 16.7 | 10.5 | 17.5 | 10.4 | 6.9 | 5.5 | 15.1 | 20.4 | 9.1 |
| Elongation at break (%) | 662 | 567 | 713 | 621 | 711 | 54 | 702 | 695 | 33 |
| 10% modulus (MPa) | — | — | — | — | — | — | 4.1 | 4.5 | 8.3 |
| 20% modulus (MPa) | 6.0 | 5.6 | 4.8 | 4.7 | 8.0 | 6.6 | — | — | — |

(*)comparative

What is claimed is:

1. A cable comprising a conductor and one or more coating layers, wherein at least one of the coating layers comprises, as non-crosslinked base polymer material, a mixture comprising: (a) a crystalline propylene homopolymer or copolymer; and (b) a copolymer of ethylene with at least one alpha-olefin having from 4 to 12 carbon atoms, and optionally, a diene; the copolymer (b) characterized by a density between and 0.86 g/cm$^3$ and 0.90 g/cm$^3$, and by a Composition Distribution Index, defined as the weight percentage of copolymer molecules having an alpha-olefin content within 50% of the average total molar content of alpha-olefin, of greater than 45%.

2. The cable of claim 1, wherein at least one of the coating layers has electrical insulating properties and comprises a mixture of (a) and (b) as non-crosslinked base polymer material.

3. The cable of claim 1, wherein at least one of the coating layers has semiconductive properties and comprises a mixture of (a) and (b) as non-crosslinked base polymer material.

4. The cable of claim 1, wherein at least one of the coating layers is an outer protective sheath and comprises a mixture of (a) and (b) as non-crosslinked base polymer material.

5. The cable of claim 1, wherein at least 70%, preferably at least 90%, by weight relative to the total weight of the base polymer material of the coating layers consists of a mixture of (a) and (b).

6. The cable of claim 1, wherein the copolymer (b) has a molecular weight distribution index of between 1.5 and 3.5.

7. The cable of claim 1, wherein the copolymer (b) has a melting enthalpy between 30 J/g and 60 J/g.

8. The cable of claim 1, wherein the copolymer (b) is obtainable by copolymerization of ethylene with an alpha-olefin, and optionally, a diene, in the presence of a single-site catalyst.

9. The cable of claim 8, wherein the single-site catalyst is a metallocene catalyst.

10. The cable of claim 8, wherein the single-site catalyst is a Constrained Geometry Catalyst.

11. The cable of claim 1, wherein the copolymer (b) comprises: 75–97 mol % of ethylene; 3–25 mol % of alpha-olefin; and 0–5 mol % of a diene.

12. The cable of claim 11, wherein the copolymer (b) comprises: 90–95 mol % of ethylene; 5–10 mol % of alpha-olefin; and 0–2 mol % of a diene.

13. The cable of claim 1, wherein the alpha-olefin in the copolymer (b) is 1-hexene or 1-octene.

14. The cable of claim 1, wherein the crystalline propylene homopolymer or copolymer (a) has a melting enthalpy greater than 75 J/g.

15. The cable of claim 14, wherein the crystalline propylene homopolymer or copolymer (a) has a melting enthalpy greater than 85 J/g.

16. The cable of claim 1, wherein the copolymer (b) is present in admixture with the crystalline propylene homopolymer or copolymer (a) in a predetermined amount, so as to make the resulting polymer mixture sufficiently flexible.

17. The cable of claim 16, wherein the copolymer (b) is present in admixture with the crystalline propylene homopolymer or copolymer (a) in an amount such that the resulting polymer mixture has a elongation at break value, measured according to CEI standard 20-34, §5.1, of at least 100%, and a 20% modulus value, measured according to CEI standard 20-34, §5.1, of less than 10 MPa.

18. The cable of claim 17, wherein the copolymer (b) is present in admixture with the crystalline propylene homopolymer or copolymer (a) in an amount such that the resulting polymer mixture has a elongation at break value, measured according to CEI standard 20-34, §5.1, of at least 200%, and a 20% modulus value, measured according to CEI standard 20-34, §5.1, of less than 7 MPa.

19. The cable of claim 1, wherein the polymer mixture comprises from 10% to 60% by weight of crystalline propylene homopolymer or copolymer (a) and from 40% to 90% by weight of copolymer (b), the percentages being relative to the total weight of the polymeric components (a) and (b).

20. The cable of claim 19, wherein the polymer mixture comprises from 15% to 50% by weight of crystalline propylene homopolymer or copolymer (a) and from 50% to 85% by weight of copolymer (b), the percentages being relative to the total weight of the polymeric components (a) and (b).

* * * * *

UNITED STATES PATENT AND TRADEMARK OFFICE
CERTIFICATE OF CORRECTION

PATENT NO. : 6,255,399 B1  Page 1 of 1
DATED : July 3, 2001
INVENTOR(S) : Luca Castellani et al.

It is certified that error appears in the above-identified patent and that said Letters Patent is hereby corrected as shown below:

Column 9,
Line 14, "of-the" should read -- of the --.
Line 20, after "between", delete "and".

Signed and Sealed this

Thirtieth Day of April, 2002

Attest:

JAMES E. ROGAN
Attesting Officer  Director of the United States Patent and Trademark Office